H. D. SINGER & H. VAN D. PRATT.
STEAM TRAP.
APPLICATION FILED JULY 8, 1911.

1,032,787.

Patented July 16, 1912.

Witnesses:
Chas. H. Buell
G. F. Chase

Inventors:
Harold D. Singer
Howard V. D. Pratt,
By Dyrenforth, Lee, Chritton & Wiles
Attys.

UNITED STATES PATENT OFFICE.

HAROLD DOUGLAS SINGER AND HOWARD VAN DOREN PRATT, OF HOSPITAL, ILLINOIS.

STEAM-TRAP.

1,032,787.  Specification of Letters Patent.  Patented July 16, 1912.

Application filed July 8, 1911. Serial No. 637,488.

*To all whom it may concern:*

Be it known that we, HAROLD D. SINGER, a British subject, and HOWARD V. D. PRATT, a citizen of the United States, residing at Hospital, in the county of Kankakee and State of Illinois, have invented a new and useful Improvement in Steam-Traps, of which the following is a specification.

Our invention relates to improvements in the construction of traps for discharging the water of condensation from steam apparatus, and wherein the valve mechanism for regulating the water-discharge is governed by a float.

Our object is to provide a trap of this class of simple and improved construction rendering it particularly desirable for its purpose.

Figure 1:
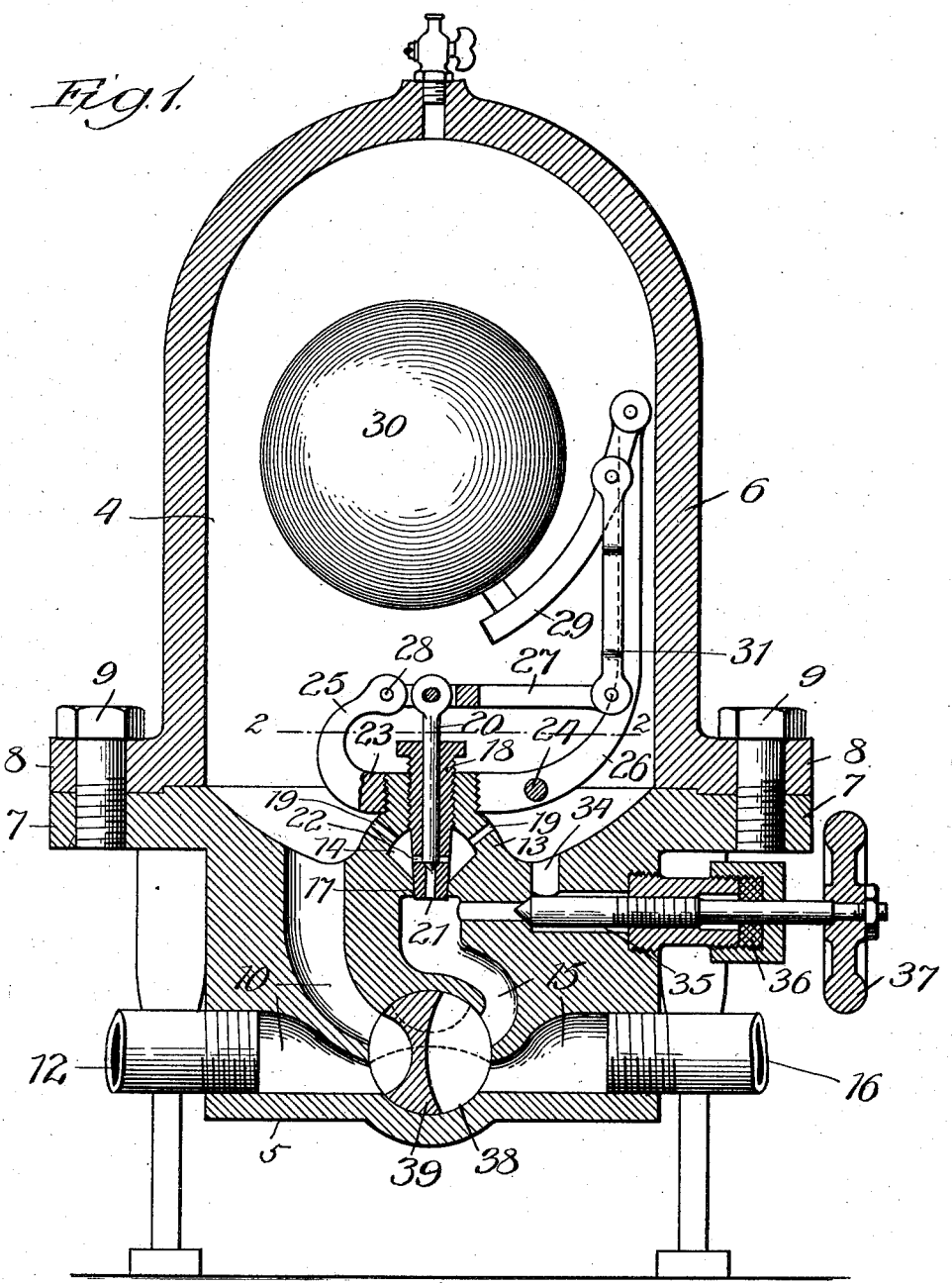
Figure 2:
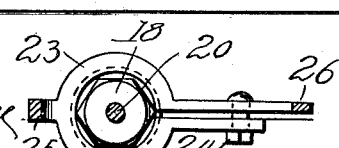

In the accompanying drawing Figure 1 shows our steam-trap in vertical section, and Fig. 2 is a section taken on line 2 in Fig. 1.

The trap casing which incloses the trap chamber 4 consists of a base 5 and a preferably dome-shaped body or cover 6. Surrounding the base is a flange 7 against which a similar flange 8 on the cover fits steam-tight, the flanges having annular series of coincident perforations for bolts 9 which fasten the parts together. In the base is a threaded inlet-passage 10, with which the inlet pipe 12 may be connected. At the center of the base 5 is a boss 13, a chamber 14 and a threaded port or outlet opening 15 for connection with the discharge-pipe 16. Between the chamber 14 and outlet 15 is a tapering opening 17. Extending through a threaded opening in the boss 13 is an externally threaded and perforated plug 18 having a tapered lower end-portion fitting and seating in the opening 17. The chambers 4 and 14 communicate through an annular series of perforations 19 in the boss. The plug 18 forms a guide for the needle-valve 20, which is adapted to seat upon and close the port 21 in the lower end of the plug. In the plug 18 is an annular series of perforations 22 forming a passage from the chamber 14 to the port 21. The upper end-portion of the boss 13 is externally threaded to receive a threaded collar 23, which is split, as shown in Fig. 4, and may be tightened in adjusted position by means of a screw 24. Integral with the collar 23 at one side is a short curved arm 25 and at opposite side a long curved arm 26, the arms being shaped as indicated. A lever 27 is fulcrumed at its end upon a pin 28 passing through the end of the arm 25; and between its ends the said lever is pivotally connected with the upper end of the needle-valve 20. Fulcrumed upon the upper end of the arm 26 is a lever 29 carrying a float 30. The connection between the needle-valve and the lever 27 is near the fulcrum of the latter, and extending between the lever 27 and lever 29 near its fulcrum is a link 31.

The operation of the device is similar to that of other devices of this type. When water of condensation rises in the chamber 4 it lifts the float 30 and through the lever connection with the needle-valve 20 unseats the same to permit the water to flow from the main chamber 4 through the perforations 19, small chamber 14, perforations 22 and outlet port 21 to the pipe 16. In the descent of the float 30 the needle-valve closes the port 21.

Extending from the chamber 4 to the outlet opening 15 is a drainage passage 34 controlled by a needle-valve 35 passing through a stuffing-box 36 and having an operating handle 37. When it is desired to drain the chamber 4 or blow out any sediment collected therein, this may be done by opening the valve 35.

The construction of the plug 18, involving its tapering lower end-portion seating in the tapering opening 17, renders it steam and water tight without depending upon the threads alone for that purpose. The perforations 19 and 22 operate in effect as a double strainer to prevent solids from entering to the needle-valve seat at the port 21 and thus preventing the valve from being tightly closed by the float. The split collar 23 renders it easy to properly adjust the needle-valve and its operating mechanism with reference to the needle-valve seat, and the compound lever-mechanism enables the float to readily seat and unseat the needle-valve.

Our steam trap provided as described is very compact and simple to construct. It is easy to adjust, very effective in operation, and has no parts which are at all likely to get out of order in use. All the working parts are carried by the base 5 and access may be had thereto merely by the removal of the cover 6. Interposed in and between the passages 10 and 15 is a rotary plug 39 which is adapted in one position to open communication between the pipe 12 and chamber 4 on the one hand, and the port 21 and pipe 16 on the other hand, and which in another position will close said communications and open the pipe 12 directly to the pipe 16. In the latter position of the plug-valve the trap is cut out of communication with the conduit formed by the pipes 12 and 16. Ordinarily the plug-valve would be turned to the position shown, but whenever it is desired to adjust or repair the device without shutting off the flow, or when it is desired to blow out the conduit rapidly, the plug may be turned to the position of cutting out the trap.

The foregoing description is intended to convey a clear understanding of our improvements in what we now believe to be the best form of their embodiment, and no undue limitation should be understood therefrom.

It is our intention to claim all that is novel in our invention and that the claims shall be construed as broadly as the prior state of the art may permit.

What we claim as new and desire to secure by Letters Patent, is:

1. In a steam-trap, the combination of a main steam-tight chamber having a base provided with inlet and outlet openings, a boss on the base having a small chamber, communicating through a series of perforations with the main chamber, and having a tapering passage extending from said small chamber to said outlet-opening, a hollow externally-threaded plug working through a threaded opening in the boss and extending across said small chamber and having a tapering end-portion fitting said tapering passage, the plug having a port communicating with said outlet and also having an annular series of perforations affording communication between said small chamber and said port, a needle-valve in the plug governing said port, a float in the main chamber, and lever mechanism connecting said valve with the float, all constructed and arranged to operate substantially as set forth.

2. In a steam-trap, the combination of a main steam-tight chamber having a base, a hollow boss on the base having an externally-threaded portion in said chamber, the base having an outlet-port beneath the boss, a valve governing said port, an internally-threaded collar fitting and adjustable upon the threaded portion of the boss, means for locking the collar in adjusted position on the boss, a float in said chamber, arms upon said collar, and compound lever-mechanism connecting said valve and float and fulcrumed upon said arms, all arranged to operate substantially as set forth.

HAROLD DOUGLAS SINGER.
HOWARD VAN DOREN PRATT.

In presence of—
CHAS. A. MUELLER,
F. M. LOCKWOOD.

---

Copies of this patent may be obtained for five cents each, by addressing the "Commissioner of Patents, Washington, D. C."